United States Patent
Draak et al.

(10) Patent No.: US 12,218,516 B2
(45) Date of Patent: Feb. 4, 2025

(54) WIRELESS POWER TRANSFER

(71) Applicant: KONINKLIJKE PHILIPS N.V., Eindhoven (NL)

(72) Inventors: Johannes Wilhelmus Draak, Horst (NL); Wilhelmus Gerardus Maria Ettes, Leeuwarden (NL); Klaas Jakob Lulofs, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 36 days.

(21) Appl. No.: 18/268,253

(22) PCT Filed: Dec. 15, 2021

(86) PCT No.: PCT/EP2021/085814
§ 371 (c)(1),
(2) Date: Jun. 19, 2023

(87) PCT Pub. No.: WO2022/136042
PCT Pub. Date: Jun. 30, 2022

(65) Prior Publication Data
US 2024/0055899 A1   Feb. 15, 2024

(30) Foreign Application Priority Data
Dec. 22, 2020  (EP) .................................... 20216484

(51) Int. Cl.
*H02J 50/12* (2016.01)
(52) U.S. Cl.
CPC .................................... *H02J 50/12* (2016.02)
(58) Field of Classification Search
CPC ................. H02J 50/12; G01R 23/07
(Continued)

(56) References Cited

U.S. PATENT DOCUMENTS

2012/0280575 A1* 11/2012 Kim ................. H02J 7/00047
                                              307/104
2013/0134795 A1   5/2013 Kanno
(Continued)

FOREIGN PATENT DOCUMENTS

EP          2950415 A     12/2015
WO     2018163170 A1      9/2018

OTHER PUBLICATIONS

International Search Report and Written Opinion from PCT/EP2021/085814 mailed Mar. 17, 2022.
QI Specification.

*Primary Examiner* — Rexford N Barnie
*Assistant Examiner* — Thai H Tran

(57) ABSTRACT

A power transmitter (101) comprises a driver (201) generating a drive signal for an output resonance circuit comprising transmitter coil (103) generating a power transfer signal. A resonance detector (307) determines a coupled resonance frequency for the output resonance circuit during where the coupled resonance frequency is a resonance frequency for the output resonance circuit for the transmitter coil (103) being coupled to a receiver coil (107) which is part of a power transfer input resonance circuit of the power receiver (105). The input resonance circuit has a quality factor of no less than ten. An estimation circuit (309) determines a coupling factor estimate for the coupling between the transmitter coil (103) and the receiver coil (107) in response to a non-coupled resonance frequency of the output resonance circuit and the first effective resonance frequency. An adapter (311) sets an operating parameter in response to the coupling factor estimate.

20 Claims, 15 Drawing Sheets

(58) Field of Classification Search
USPC .......................................................... 307/104
See application file for complete search history.

(56) References Cited

U.S. PATENT DOCUMENTS

2017/0288412 A1* 10/2017 Yamamoto .............. H02J 50/70
2018/0262038 A1*  9/2018 Files ....................... H02J 50/12

* cited by examiner

WIRELESS POWER TRANSFER

CROSS-REFERENCE TO PRIOR APPLICATIONS

This application is the U.S. National Phase application under 35 U.S.C. § 371 of International Application No. PCT/EP2021/085814, filed on Dec. 15, 2021, which claims the benefit of EP Patent Application No. EP 20216484.4, filed on Dec. 22, 2020. These applications are hereby incorporated by reference herein.

FIELD OF THE INVENTION

The invention relates to a wireless power transfer system and in particular, but not exclusively, to the operation of a power transmitter providing inductive power transfer to high power devices, such as e.g. kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being further developed. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

The Wireless Power Consortium has on the basis of the Qi Specification proceeded to develop the Ki Specification (also known as the Cordless Kitchen Specification) which is aimed at providing safe, reliable, and efficient wireless power transfer to kitchen appliances. Ki supports much higher power levels up to 2.2 KW.

EP2940415A1 discloses an approach for foreign object detection using a dedicated detection resonance circuit.

A potential problem with wireless power transfer is that the power transfer performance may depend significantly on the specific conditions. In particular, the power transfer performance in terms of efficiency, achievable power levels, adaptation response times, etc., tend to depend heavily on how the transmitter coil and the receiver coil are positioned relatively to each other. In general, more efficient and reliable power transfer tends to be achieved for the coils aligning and being closer to each other.

Typically, the power transfer performance depends on the coupling factor or coefficient and the higher the coupling factor the more efficient the power transfer.

Although closer alignment and higher coupling factors can be achieved by designing the devices such that the positioning of the power receiver device relative to the power transmitter device is severely constrained, e.g. restricting the power receiver to one specific position, this is generally undesirable as it restricts the practicality of the system. For example, for kitchen appliances where the power transmitter is implemented in a worktop, it is preferable that the user can simply position the appliance approximately near to a power transmitter coil with the system then adapting accordingly. It is also preferable for the power transfer function to be implemented without requiring e.g. mechanical or physical guide features constraining the power receiver device, e.g. it is desired that the power transmitter can be implemented using a completely flat worktop surface.

In order to take into account that operating conditions may vary substantially, power transfer may be initiated with an initial operating point that may provide acceptable performance for worst case conditions. During power transfer, control loops may adapt the operating point to a more optimal operating point. Specifically, power transfer may be initiated with low power levels and then gradually increased during power transfer.

However, such approaches tend to be suboptimal and not provide ideal performance. It tends to introduce a delay before optimum performance is achieved. In many scenarios and situations, the approach may not result in the optimum operating point being reached, e.g. due to the control loop settling on a local extreme rather than proceeding to a global optimum.

Hence, an improved operation for a power transfer system would be advantageous and, in particular, an approach allowing increased flexibility, reduced cost, reduced complexity, improved coupling factor estimation, backwards compatibility, improved suitability for higher power level transfers, improved initialization of power transfer, improved adaptation to specific operating conditions, and/or an improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an inductive power transfer signal; the power transmitter comprising: an output resonance circuit comprising a transmitter coil and at least one capacitor; a driver arranged to generate a drive signal for the output resonance circuit to generate the inductive power transfer signal; a resonance detector arranged to determine a first coupled resonance frequency for the output resonance circuit during a resonance measurement time interval, the first coupled resonance frequency being a resonance frequency for the output resonance circuit for the transmitter coil being coupled to a receiver coil of a power transfer input resonance circuit of the power receiver, the power transfer input resonance circuit having a quality factor of no less than ten during the resonance measurement time interval; an estimation circuit arranged to determine a coupling factor estimate for a coupling between the transmitter coil and the receiver coil in response to a non-coupled resonance frequency of the output resonance circuit and the first coupled resonance frequency; and an adapter for setting an operating parameter in response to the coupling factor estimate.

The invention may provide improved power transfer in many embodiments. In many embodiments, it may provide improved initial performance and/or faster adaptation and convergence to a preferred operating point. In many embodiments, the approach may provide improved adaptation of the power transfer to changing operating conditions. The approach may typically provide advantageous power transfer operation and performance while allowing low complexity implementation. The approach may allow an efficient and/or reliable and/or accurate determination of a coupling factor which may allow improved adaptation of typically critical parameters of a power transfer thereby allowing improved power transfer.

A particular advantage of the approach is that it in many embodiments may be fully power transmitter based with no specific estimation process or calculation necessarily being performed at the power receiver. This may reduce cost in many scenarios. It may facilitate implementation and/or provide improved backwards compatibility.

The coupling factor estimate may be a coupling factor change estimate.

A non-coupled resonance frequency for a resonance circuit may be a resonance frequency when there is no inductive coupling from the resonance circuit to an inductor that is not part of the resonance circuit. A non-coupled resonance frequency for the output resonance circuit may be a resonance frequency when the transmitter coil is not coupled to the receiver coil (nor typically to any other inductor).

The first coupled resonance frequency may be a resonance frequency of the output resonance circuit when this is coupled to the receiver coil 107 and when the power receiver is in a power transfer position for the power transfer.

In some embodiments, the power transfer input resonance circuit has a quality factor of no less than 20, 50, 100, or even 500 during the resonance measurement time interval.

In accordance with an optional feature of the invention, the resonance detector is arranged to control the driver to generate the drive signal to have a varying frequency during the resonance measurement time interval and to determine the first coupled resonance frequency in response to at least one of a voltage of the drive signal, a current of the drive signal, and a phase difference between the voltage of the drive signal and the current of the drive signal.

This may provide a particularly advantageous approach and may lead to a highly effective and practical determination of the coupling factor and thus an improved setting of the operating parameter.

In accordance with an optional feature of the invention, the resonance detector is arranged to control the driver to perform a frequency sweep of the drive signal from higher frequencies towards lower frequencies, and to determine the first coupled resonance frequency as a first detected frequency for which a resonance criterion for the drive signal is met.

This may in many embodiments provide improved detection of the coupled resonance frequency for the output resonance circuit and thus an improved coupling factor estimate and improved setting of the operating parameter leading to improved power transfer.

In accordance with an optional feature of the invention, the resonance measurement time interval is during an initialization of a power transfer operation, and the operating parameter is an initial operating parameter for the power transfer operation.

The approach may allow improved initialization of a power transfer. The approach may allow a faster and/or more reliable convergence towards a preferred operating point for the power transfer.

In accordance with an optional feature of the invention, the driver is arranged to, during a power transfer phase, generate the drive signal in accordance with a repeating time frame comprising at least one power transfer time interval and at least one measurement time interval, and wherein the resonance measurement time interval is comprised in a measurement time interval.

The approach may allow improved adaptation to changing operating conditions during a power transfer, such as specifically an improved adaptation to movements of the power receiver relative to the power transmitter.

In many embodiments, a duration of the measurement time interval is no more than 5%, 10%, or 20% of the duration of the time frame. In many embodiments, the duration of the measurement time interval(s) is no less than 70%, 80%, or 90% of the time frame. A duration of the measurement time interval(s) may in many scenarios not exceed 5 msec, 10 msec, or 50 msec.

In accordance with an optional feature of the invention, the operating parameter is a parameter controlling a power level of the power transfer signal.

This may provide particularly advantageous operation in many embodiments.

The parameter controlling a power level of the power transfer signal may specifically be a parameter of the drive signal such as a frequency, duty cycle, phase, current, and/or voltage of the drive signal.

In accordance with an optional feature of the invention, the operating parameter is a power loop parameter being a loop parameter of a power control loop arranged to adapt a power level of the power transfer signal in response to power control messages received from the power receiver.

This may provide particularly advantageous operation in many embodiments. It may allow the control response for the power transfer to be adapted and/or optimized dynamically for the current conditions. The approach may in many scenarios allow faster control operation while still ensuring stability of the control loop.

The loop parameter may specifically be a loop gain and/or loop delay.

In accordance with an optional feature of the invention, the estimation circuit is further arranged to determine the coupling factor estimate in response to a non-coupled resonance frequency of the power transfer input resonance circuit.

This may allow improved estimation of the coupling factor in many scenarios. It may facilitate determination of the coupling factor estimation.

The non-coupled resonance frequency of the power transfer input resonance circuit may be a resonance frequency of the power transfer input resonance circuit when the receiver coil is not coupled to the transmitter coil (nor typically to any other inductor).

In accordance with an optional feature of the invention, the resonance detector is further arranged to determine a second coupled resonance frequency for the output resonance circuit during the resonance measurement time interval, the second operating resonance frequency being a different resonance frequency for the output resonance circuit in the presence of the power receiver; and the estimation circuit is further arranged to determine the coupling factor estimate in response to the second operating resonance frequency.

This may provide particularly advantageous and/or facilitated operation and/or performance in many embodiments.

In accordance with an optional feature of the invention, the estimation circuit is arranged to determine the coupling factor estimate in response to at least one of the following equations and $$Fres2 := \frac{1}{\sqrt{2}} \cdot \sqrt{\frac{(fp^2 + fs^2) - \sqrt{(fp^2 + fs^2)^2 - 4 \cdot fp^2 fs^2 \cdot (1-k^2)}}{1-k^2}}$$

where $f_p$ is the non-coupled resonance frequency of the resonant output circuit, $f_s$ is a non-coupled resonance frequency of the power transfer input resonance circuit, Fres1 is the first coupled resonance frequency, Fres2 is a second coupled resonance frequency, and k is the coupling factor.

This may provide particularly advantageous and/or facilitated operation and/or performance in many embodiments.

In accordance with another aspect of the invention, there is provided a wireless power transfer system comprising a power transmitter and a power receiver, the power transmitter being arranged to wirelessly provide power to the power receiver via an inductive power transfer signal; the power transmitter comprising: an output resonance circuit comprising a transmitter coil and at least one capacitor; a driver arranged to generate a drive signal for the output resonance circuit to generate the inductive power transfer signal; a resonance detector arranged to determine a first coupled resonance frequency for the output resonance circuit during a resonance measurement time interval, the first coupled resonance frequency being a resonance frequency for the output resonance circuit for the transmitter coil being coupled to a receiver coil of a power transfer input resonance circuit of the power receiver, the power transfer input resonance circuit having a quality factor of no less than ten during the resonance measurement time interval; an estimation circuit arranged to determine a coupling factor estimate for a coupling between the transmitter coil and the receiver coil in response to a non-coupled resonance frequency of the output resonance circuit and the first coupled resonance frequency; and an adapter for setting an operating parameter in response to the coupling factor estimate; and the power receiver comprising a power transfer input resonance circuit comprising a receiver coil 107 for extracting power from the power transmitter and at least one capacitor; the power transfer input resonance circuit having a quality factor of no less than ten during the resonance measurement time interval.

In accordance with an optional feature of the invention, the power receiver further comprises a circuit for switching from a power transfer mode in which the quality factor is not constrained to be no less than ten to a measurement mode during the resonance measurement time interval, the quality factor being no less than ten when the power receiver is operation in the measurement mode.

This may provide particularly advantageous and/or facilitated operation and/or performance in many embodiments.

In accordance with an optional feature of the invention, the power receiver further comprises a circuit for short circuiting the power transfer input resonance circuit during the resonance measurement time interval.

This may provide particularly advantageous and/or facilitated operation and/or performance in many embodiments.

In accordance with another aspect of the invention, there is provided a method of operation for a power transmitter wirelessly providing power to a power receiver via an inductive power transfer signal; the power transmitter comprising: an output resonance circuit comprising a transmitter coil and at least one capacitor; and the method comprising: generating a drive signal for the output resonance circuit to generate the inductive power transfer signal; determining a first coupled resonance frequency for the output resonance circuit during a resonance measurement time interval, the first coupled resonance frequency being a resonance frequency for the output resonance circuit for the transmitter coil 103 being coupled to a receiver coil 107 of a power transfer input resonance circuit of the power receiver, the power transfer input resonance circuit having a quality factor of no less than ten during the resonance measurement time interval; determining a coupling factor estimate for a coupling between the transmitter coil and the receiver coil in response to a non-coupled resonance frequency of the output resonance circuit and the first coupled resonance frequency; and setting an operating parameter in response to the coupling factor estimate.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi Specification or the Ki Specification. However, it will be appreciated that the invention is not limited to this application but may be applied to many other wireless power transfer systems.

Figure 1:
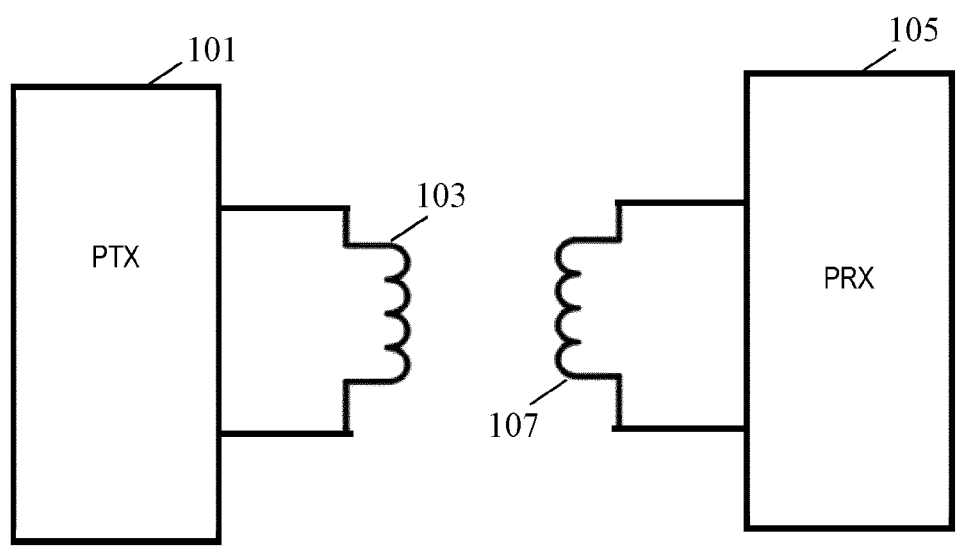
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an inductive electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz or for Ki compatible systems typically in the range between 20 kHz to 80 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 2000 W for very high power applications, such as e.g. for Ki kitchen applications.

In the following, the operation of the power transmitter 101 and the power receiver 105 will be described with specific reference to an embodiment generally in accordance with the Qi or Ki Specifications (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

For many wireless power transfer systems, and in particular high power systems such as Ki, utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

In most power transfer systems, before power transfer is initiated, a communication channel between the power transmitter 101 and the power receiver 105 is established. When the communication has been set up and identification of the two devices has been achieved, the power transmitter 101 may start power transmission to the power receiver 105.

Figure 2:
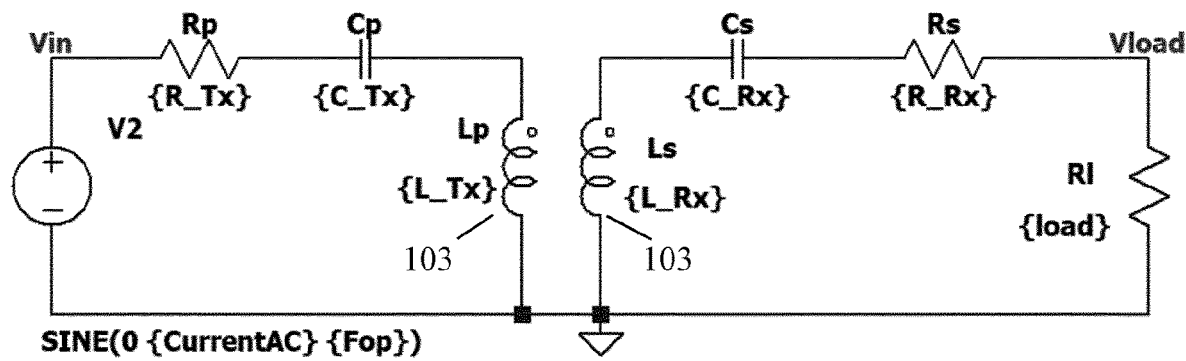
FIG. 2 illustrates an example of an equivalence circuit for the power transfer system of FIG. 1.

An example of an electrical equivalence diagram for the power transfer function of the power transmitter 101 and the power receiver 105 is illustrated in FIG. 2. A wide range of power transmitters and power receivers may exist in a given system and these may have substantially different properties and parameters. For example, the coil sizes, induction values, and loads may vary substantially. Accordingly, the system parameters, as specifically represented in FIG. 2, may in practice vary significantly between different devices, mechanical constructions, positioning etc. In particular, the placement of the power receiver, and thus the relative positions of the receiver coil 107 and the transmitter coil 103, substantially affect the coupling between the coils, i.e. the primary (power transmitter side) inductor Lp and the secondary (power transmitter side) inductor Ls, and thus may significantly change the system behavior.

Furthermore, the power receiving devices may have several different modes in which they operate, such as for example with several loads being switched on or off in different modes. For example, for the power receiver being an air fryer appliance, the heating element can be turned on and off. This may e.g. results in a very substantially load step from, say, 50 to 1200 W and vice versa. Further, such load switching may be repeated during operation of the device to keep the temperature constant.

Systems can also contain non-linear loads, e.g. rather than a resistive component, the power receiver may drive a motor, such as e.g. a motor of a food processor. This results in a completely different response of the system and this has a large impact on specifically the control system design.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The appliance sends this error signal to the power control function in the power transmitter to reduce the static error, ideally to zero.

However, since the system performance and operation vary greatly depending on the existing power transmitter and power receiver combination and placements, the appropriate operating point also varies greatly. This includes the conditions at start-up/initialization of a power transfer, and thus the optimum initial operating point also varies greatly.

One of the key parameters affecting the operation is the coupling factor. Further, the coupling factor tends to be dependent on the positioning of the power receiver relative to the power transmitter (and specifically the receiver coil 107 relative to the transmitter coil 103) and is therefore dependent on the specific operating conditions. In contrast, most other parameters of FIG. 2 tend to be known and tend to be relatively constant for the specific power transmitter and receiver coil 107 combination. Thus, typically, almost all relevant system parameters may be known except for the coupling factor. The coupling factor depends on a number of parameters including in particular the sizes/geometry of the coils and the distance between the power transmitter and power receiver.

In the system of FIG. 1, the system comprises functionality for estimating a coupling factor and for adapting an operating parameter in response to the coupling factor. Specifically, in many embodiments, a parameter of the control loop, such as the open loop transfer function and/or the loop gain, may be adapted in order to optimize and control the closed loop performance. As another example, the preferred (typically initial) operating point such as e.g. the power level may be adapted depending on the coupling factor. The measurement and adaptation may in some embodiments be performed before power transfer, or may alternatively or additionally be performed after power transfer.

As an exemplary operation, when a power receiver is placed on a power transmitter, communication between them may be established. This may allow the power transmitter to start transmitting power, but first it needs to establish a suitable operating point. One option would be to select a very safe and reliable operating point for which it can be guaranteed that operation is possible in worst case scenarios, followed by a gradual adaptation of the operating point during the power transfer. However, such an approach tends to be slow and inefficient, and indeed in many scenarios it may not be feasible to adapt gradually to the optimum operating point (for example, the system may be stuck on a local maximum rather than proceed to a global maximum).

Therefore, it may be preferred to determine a desired operating point, and initiate the operation at, or close to, this desired operating point. The desired operating point can be estimated using all the known system parameters. These may for example comprise (or consist of): primary and secondary inductance; primary and secondary resonance; load resistance, power and voltage; and coupling factor.

With all these parameters being known, the transfer function for the power path can be calculated and an initial operating point can be determined. However, whereas most of the parameters can be known by the power transmitter e.g. based on communication of power receiver parameters from the power receiver, the coupling factor depends on the placement/misalignment of the devices and therefore cannot be known in advance.

In the example, the power transmitter may accordingly proceed to measure/estimate the coupling factor. This may for example be done by determining one or more resonance frequencies for the power transmitter resonance circuit when loaded by the power receiver. The power receiver may be entered into a high-Q mode during such a measurement and the resonance frequency may be determined by the power transmitter by a frequency sweep of the signal driving the transmitter coil 103. Based on the resonance frequency, the coupling factor can be calculated based on the free running resonance frequencies of the power receiver resonance frequency and the power transmitter resonance frequency.

This coupling factor can then be used to calculate the complete transfer function, and then to calculate the initial operating point and the required operating parameters, such as e.g. the initial power level and/or loop gain. Setting the operating parameters to the calculated values may allow the initial operating point to be reached from the start of the power transfer which will result in the appropriate power/current being delivered to the power receiver.

Indeed, by measuring the coupling factor of a power transfer system before power is transferred, a better estimation of the system response can be made. This may result in a better selection of the initial operating point (frequency, duty cycle of the power signal, loop gain etc). This may allow for the desired power level to be reached much faster. Further, such an approach may reduce the risk of overvoltage or overcurrent conditions occurring.

Also, measuring the coupling factor during power transfer and adapting the operating parameter(s) based on such a measurement may provide improved performance and may typically provide for a more accurate optimization and adaptation.

Figure 3:
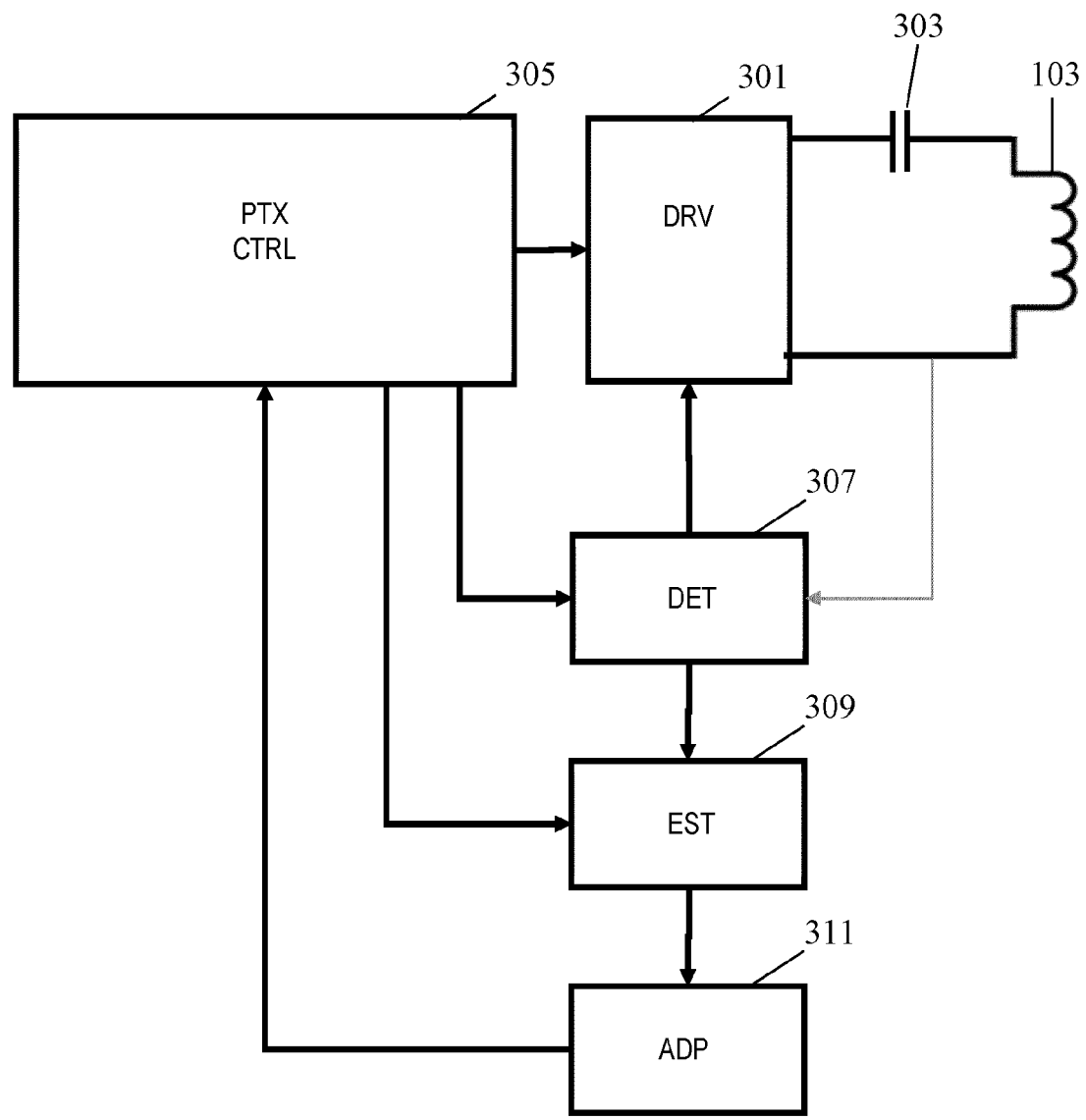
FIG. 3 illustrates an example of elements of a power transmitter in accordance with some embodiments of the invention.

FIG. 3 illustrates elements of the power transmitter 101 of FIG. 1 in more detail.

The power transmitter 101 includes a driver 301 which can generate a drive signal that is fed to the transmitter coil 103 which in return generates the electromagnetic power transfer signal thereby providing a power transfer to the power receiver 105. The transmitter coil 103 is part of an output resonance circuit which comprises the transmitter coil 103 and a capacitor 303. In the example, the output resonance circuit is a series resonance circuit, but it will be appreciated that in other embodiments, the output resonance circuit may be a parallel resonance circuit. It will be appreciated that any suitable resonance circuit may be used including one including multiple inductors and/or capacitors.

Figure 4:
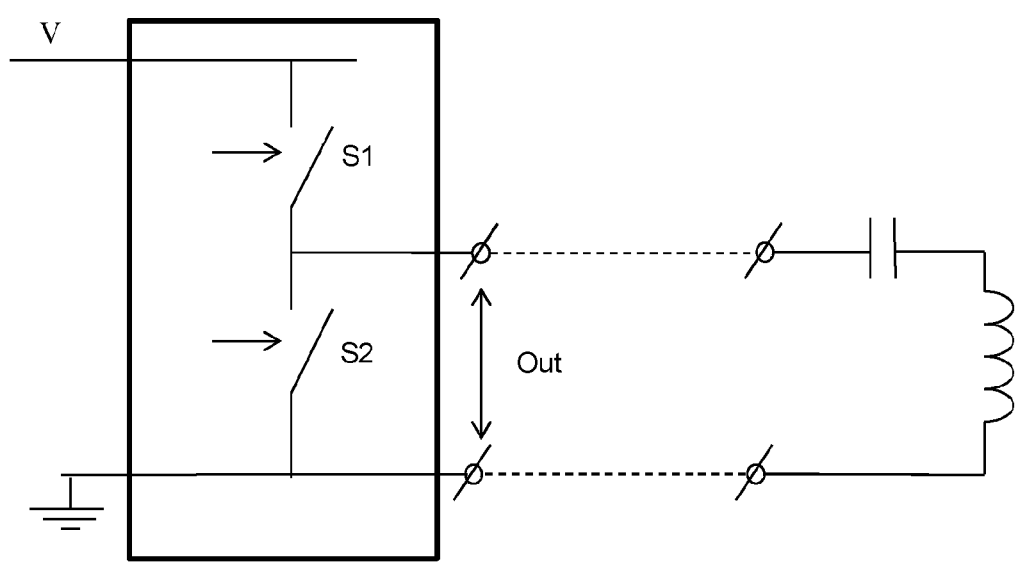
FIG. 4 illustrates an example of a half bridge inverter for a power transmitter.
Figure 5:
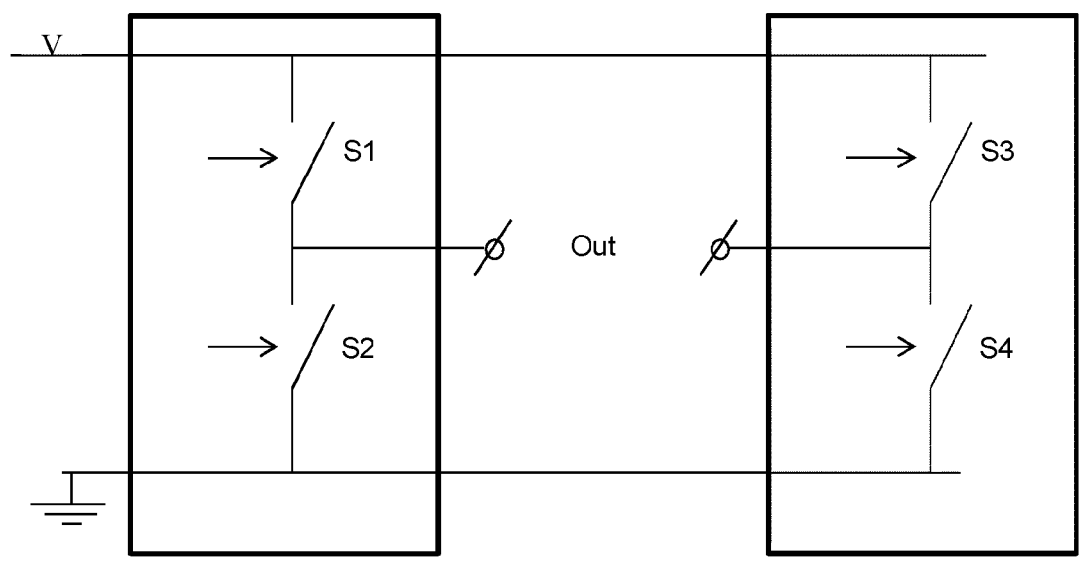
FIG. 5 illustrates an example of a full bridge inverter for a power transmitter.

The driver 301 generates the current and voltage which is fed to the output resonance circuit and thus to the transmitter coil 103. The driver 301 is typically a drive circuit in the form of an inverter which generates an alternating signal from a DC Voltage. The output of the driver 301 is typically a switch bridge generating the drive signal by the appropriate switching of switches of the switch bridge. FIG. 4 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 5 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 305 which is arranged to control the operation of the power transmitter 101 in accordance with the desired operating principles. Specifically, the power transmitter 101 may include many of the functionalities required to perform power control in accordance with the Qi Specification or the Ki Specification.

The power transmitter controller 305 is in particular arranged to control the generation of the drive signal by the driver 301, and it can specifically control the power level of the drive signal, and accordingly the level of the generated power transfer signal. The power transmitter controller 305 comprises a power loop controller controlling a power level of the power transfer signal in response to the power control messages received from the power receiver 105 during the power transfer phase.

The power transmitter controller 305 may further comprise functionality for communicating with the power receiver 105. For example, the power transmitter controller 305 may be arranged to transmit data to the power receiver 105 by modulating the power transfer signal and receive data from the power receiver 105 by detecting load modulation of the power transfer signal. It will be appreciated that in other embodiments, other means of communication may be used such as e.g. a separate communication functionality such as NFC communication may be implemented.

The use of a resonance circuit including the transmitter coil 103 is well known to provide a more efficient power transfer in many scenarios. Furthermore, having a power receiver which also employs a resonance circuit, i.e. where the receiver coil 107 is part of a resonance circuit, may result in resonant power transfer which provides a number of advantages including a highly efficient power transfer and ease of control of the power transfer, such as e.g. by controlling the frequency of the drive signal.

Figure 6:
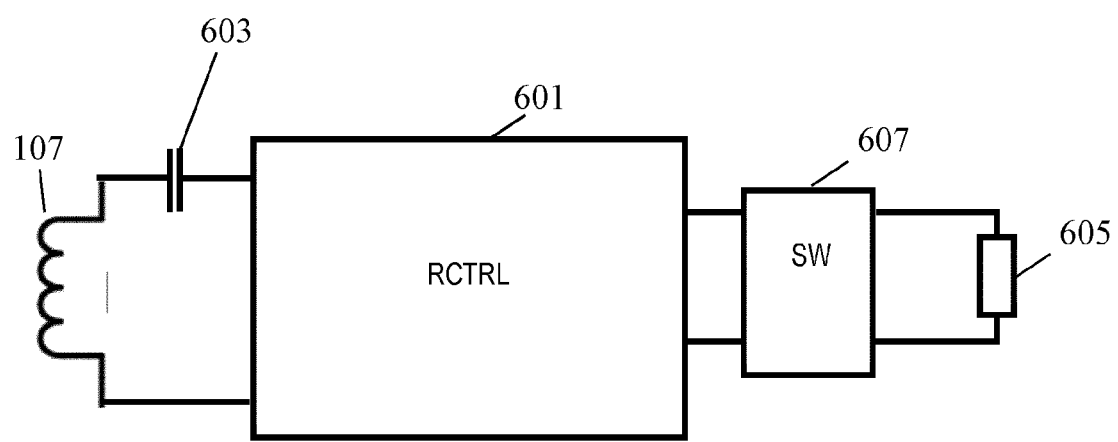
FIG. 6 illustrates an example of elements of a power receiver in accordance with some embodiments of the invention.

FIG. 6 illustrates some exemplary elements of the power receiver 105.

The receiver coil 107 is coupled to a power receiver controller 601 via a capacitor 603 which together with the receiver coil 107 forms an input resonance circuit. Thus, the power transfer may be a resonant power transfer between resonance circuits.

The power receiver controller 601 couples the receiver coil 107 to a load 605 via a switch 607 which specifically may be capable of shorting the load 605. The power receiver controller 601 includes a power control path which converts the power extracted by the receiver coil 107 into a suitable supply for the load 605. In some embodiments, the power receiver controller 601 may provide a direct power path which simply connections the input resonance circuit to the switch 607 or load 605, i.e. the power path of the power transmitter controller 303 may simply be implemented by two wires. In other embodiments, the power path may include e.g. rectifiers and possibly smoothing capacitors to provide a DC voltage. In yet other embodiments, the power path may include more complex functions, such as e.g. voltage control circuitry, impedance matching circuitry, current control circuitry etc. Similarly, it will be appreciated that the switch 607 may only be present in some embodiments and that in some embodiments the load 605 may permanently be coupled to the input resonance circuit.

In addition, the power receiver controller 601 may include various power receiver controller functionality required to perform power transfer, and in particular functions required to perform power transfer in accordance with the Qi or Ki Specifications.

The power receiver controller 601 may further comprise functionality for communicating with the power transmitter 101. For example, it may be arranged to decode and demodulate data modulated onto the power transfer signal and it may be arranged to transmit data to the power transmitter 101 by load modulating the power transfer signal. In some embodiments, a separate communication function, such as an NFC communication function may be employed.

In operation, the system is arranged to control the drive signal such that the power transfer signal attains suitable operating parameters/properties and such that the power transfer operates at a suitable operating point. In order to do so, the power transmitter is arranged to control a parameter of the drive signal using a power control loop where a power property of the power transfer signal/drive signal is controlled in response to power control error messages that are received from the power receiver.

At regular, and typically frequent, intervals, the power receiver transmits a power control error message to the power transmitter. The power receiver 105 comprises functionality for supporting such a power control loop, e.g. the power receiver controller 601 may continuously monitor the power or voltage of a load signal provided to the load and detect whether this is above or below a desired value. It may at regular intervals generate a power control error message which requests that the power level of the power transfer signal is increased or decreased, and it may transmit this power control error message to the power transmitter.

When receiving a power control error message from the power receiver, the transmit controller 305 may determine how the drive signal parameter should be modified to increase or decrease the power level of the power transfer signal as requested. It may then control and adapt the drive signal parameter accordingly.

A power control loop is accordingly employed which controls a power property of the power transfer signal to result in the desired operating point at the power receiver. The operation of the power transfer is thus controlled by a power control loop and the effective operation of this is critical to the performance of the system. Initializing or adapting the power control loop to the operation conditions is thus critical for optimum performance.

In the described system, the power transmitter comprises functionality for estimating the coupling factor and for adapting the operation of the power transfer system, and specifically the power control loop, based on the coupling factor.

The power transmitter is specifically arranged to determine the coupling factor in response to a detection/measurement of one or more resonance frequencies for the output resonance circuit (and/or equivalently for the drive signal) when it is coupled to the power receiver, and specifically to the receiver coil 107 and the input resonance circuit. It may then adapt the operation of the power transfer system accordingly.

The power transmitter 101 comprises a resonance detector 307 which is arranged to determine a coupled operating resonance frequency for the output resonance circuit during a resonance measurement time interval where the coupled resonance frequency is a resonance frequency for the output resonance circuit in the presence of the power receiver, i.e. when the transmitter coil 103 is coupled to the receiver coil 107 of the power receiver. The coupled resonance frequency accordingly reflects an effective resonance frequency of the output resonance circuit when the transmitter coil 103 is coupled to the receiver coil 107. Due to the coupling of the two coils, the effective inductance of the transmitter coil 103 is different than the self-inductance of the transmitter coil 103 when it is not coupled to any receiver coil 107. Similarly, the effective inductance of the receiver coil 107 is different than the self-inductance of the receiver coil 107 when this is not coupled to any transmitter coil 103. As a result, the effective resonances will be different to the self resonances when there is no coupling. Furthermore, due to the coupling of the two coils, and thus the two resonance circuits, the drive signals will effectively experience two (different) resonance frequencies, i.e. due to the coupling the output resonance circuit will effectively have two resonance frequencies and with these being different from the self (non-coupled) resonance frequency of the output resonance circuit.

The effective or coupled resonance frequency for the output resonance circuit will be different from the self resonance frequency of the output resonance circuit when it is not coupled to any other inductor and the difference will be dependent on the coupling. Thus, detecting the coupled or operating resonance frequency of the output resonance circuit may provide information on the coupling to the receiver coil 107, and this may in the power transmitter 101 be used to estimate the coupling factor.

The resonance detector 307 is coupled to an estimation circuit 309 which is arranged to determine a coupling factor estimate for the coupling between the transmitter coil 103 and the receiver coil 107 based on at least the coupled resonance frequency and on a non-coupled resonance frequency of the resonant output circuit. The non-coupled frequency of the output resonance circuit is the resonance frequency of the output resonance circuit when it is not coupled to an inductor and specifically to the receiver coil 107. The non-coupled resonance frequency is also referred to as the self-resonance frequency of the output resonance circuit.

Thus, the estimation circuit 309 is arranged to estimate the coupling factor based on the effect the coupling between the transmitter coil 103 and the receiver coil 107 has on the resonance frequency of the output resonance circuit.

The estimation circuit 309 is coupled to an adapter 311 which is arranged to set an operating parameter in response to the coupling factor estimate. In some embodiments, the setting may be a relative or an absolute setting. The adapter 311 may for example perform a relative setting of an operating parameter by increasing or decreasing a parameter value by a given amount, e.g. it may increase or decrease the power level from the current value.

In some embodiments, the adapter 311 may be arranged to adapt or set an operating value for a power transfer signal parameter, and specifically to set a parameter value for the power transfer signal that controls the power level of the power transfer signal. Such parameter values may include a frequency (which affects the power level for a resonant power transfer system), a phase, amplitude (current and/or voltage), or duty cycle for the power transfer signal.

For example, for a high coupling factor, the power transfer between the coils may be efficient and therefore a high power level can be set whereas for a low coupling factor the power transfer is less efficient and it should therefore be set to a lower level.

Thus, by estimating the coupling factor, it is possible to determine a suitable power level and when starting a power transfer operation, this may be initialized with that power level set to a desired value by setting the operating parameters of the power transfer signal appropriately.

The appropriate power levels may for example be determined using a look-up-table (LUT) which has been generated during manufacturing. For example, based on measurements performed for different power receivers with different properties (e.g. coil dimensions, power receiver inductance values etc.), suitable power levels may be determined for different coupling factors and stored in a LUT. During operation, when initializing a new power transfer with a new power receiver, the power receiver may transmit relevant parameter values to the power transmitter which may further estimate the coupling factor. The resulting values may be used to perform a table look-up in the LUT, and the power transfer may be initialized with the corresponding power level. The LUT may specifically output suitable values for the frequency, duty cycle, and/or amplitude for the drive signal. The adapter 311 may then e.g. provide this information to the power transmitter controller 305 which may control the driver 301 to generate a drive signal with these properties. The system may thus initiate power transfer with suitable parameters after which adaptation may be performed by the power control loop.

In some embodiments, the adapter 311 may alternatively or additionally adapt a power control loop parameter of the power control loop which controls the power level of the power transfer signal based on the power control messages received from the power receiver (105).

The open loop performance of the power control loop is heavily dependent on the coupling factor and accordingly so is the close loop performance. Indeed, in many scenarios, the closed loop may only be stable for some values of the coupling factor. Typically, the gain of the loop may be substantially proportional to the coupling factor and as the coupling factor may vary substantially, so may the gain. Variations in the gain of a loop directly affects the temporal (and frequency) response of the closed loop including the stability of the loop. The adapter 311 may be arranged to modify the loop gain to compensate for the variations in the coupling factor such that the overall gain may be at a desired level. This may provide for optimized performance with a faster acting loop as it is not necessary to set the loop gain to ensure stability in the worst case scenario.

In some embodiments, more complex adaptions of the loop may be made such as an adjustment of a delay or (open loop) frequency response. This may provide a more flexible adaptation that may allow performance to be customized more precisely. For example, the filter response may be adapted to prevent any potential self-oscillation and instability.

As for the power level of the power transfer signal, the parameters may for example be determined by measurements and experiments during design/manufacturing with the appropriate parameters being stored in a LUT. Indeed, the same LUT may store parameters both for the control loop and for the power level setting.

It will be appreciated that the operating parameters that may be adapted are not limited to power level parameters or loop parameters but that other parameters may alternatively or additionally be set in some embodiments, such as for example a foreign object detection parameter or a communication parameter.

Figure 7:
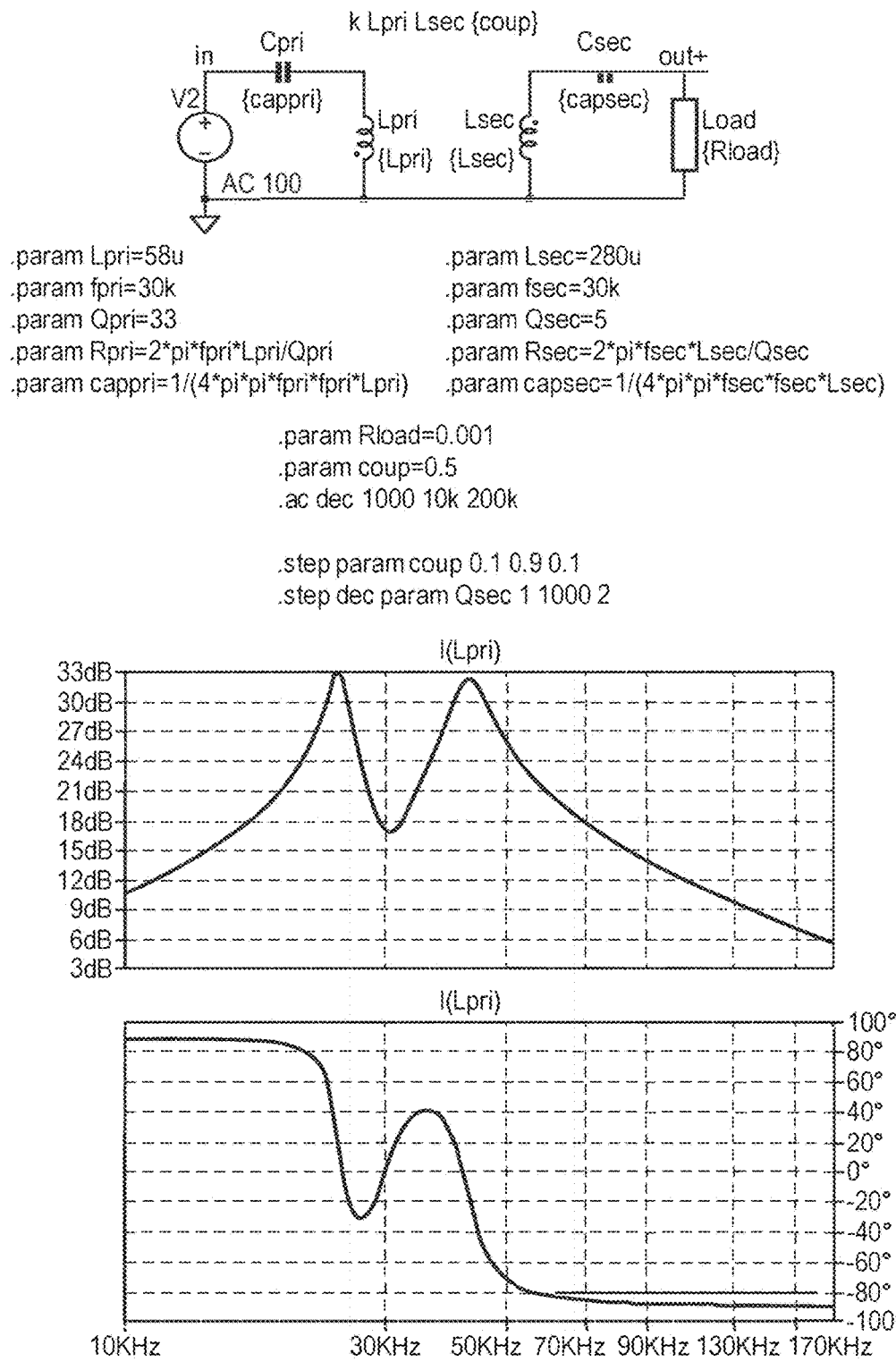
FIG. 7 illustrates an example of a response of an output resonance circuit of the power transmitter of FIG. 3.

In different embodiments, the estimator 309 may use different approaches for determining the coupling factor. As illustrated by the example of FIG. 7, the response of the output resonance circuit when coupled to the input resonance circuit is one that includes two resonances. FIG. 7 shows an example of a response (amplitude and phase of the primary current for constant voltage amplitude of the drive signal) for typical system parameters and as clearly illustrated the response comprises two resonance peaks.

Figure 8:
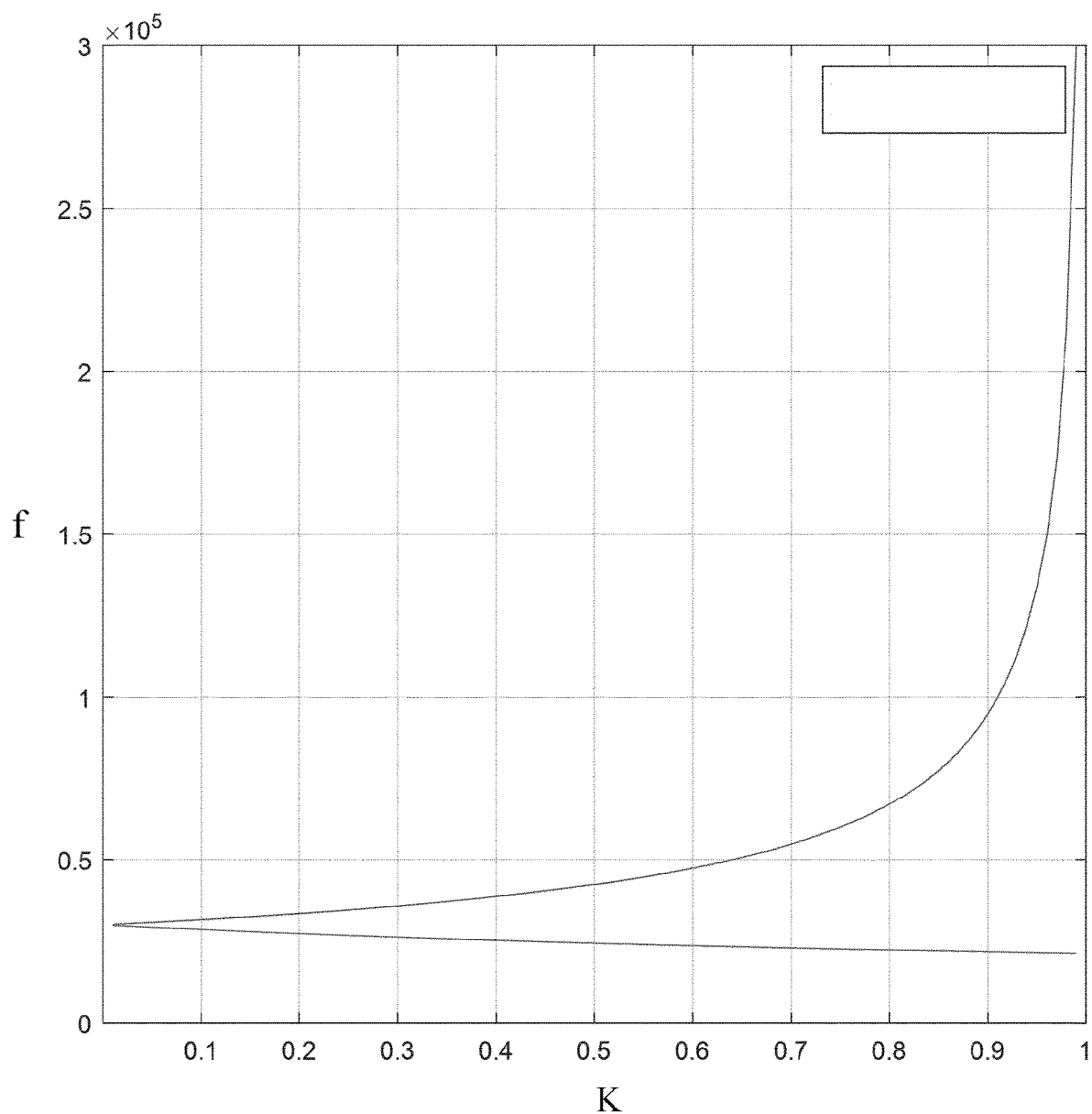
FIG. 8 illustrates an example of coupled resonance frequencies of an output resonance circuit of the power transmitter of FIG. 3 as a function of the coupling factor.

FIG. 8 illustrates an example of how the resonance frequencies of the coupled output resonance circuit varies for different coupling coefficients k. In the example, the non-coupled resonance frequencies of both the output resonance circuit and the input resonance circuit are at a normalized frequency of $0.3 \times 10^5$. As can be seen the coupled case results in a first resonance frequency above the non-coupled frequencies and in a second resonance frequency below the non-coupled frequencies. As can also be seen, there is a strong dependency of the resonance frequencies on the coupling factor with the difference increasing for an increasing coupling factor.

Figure 9:
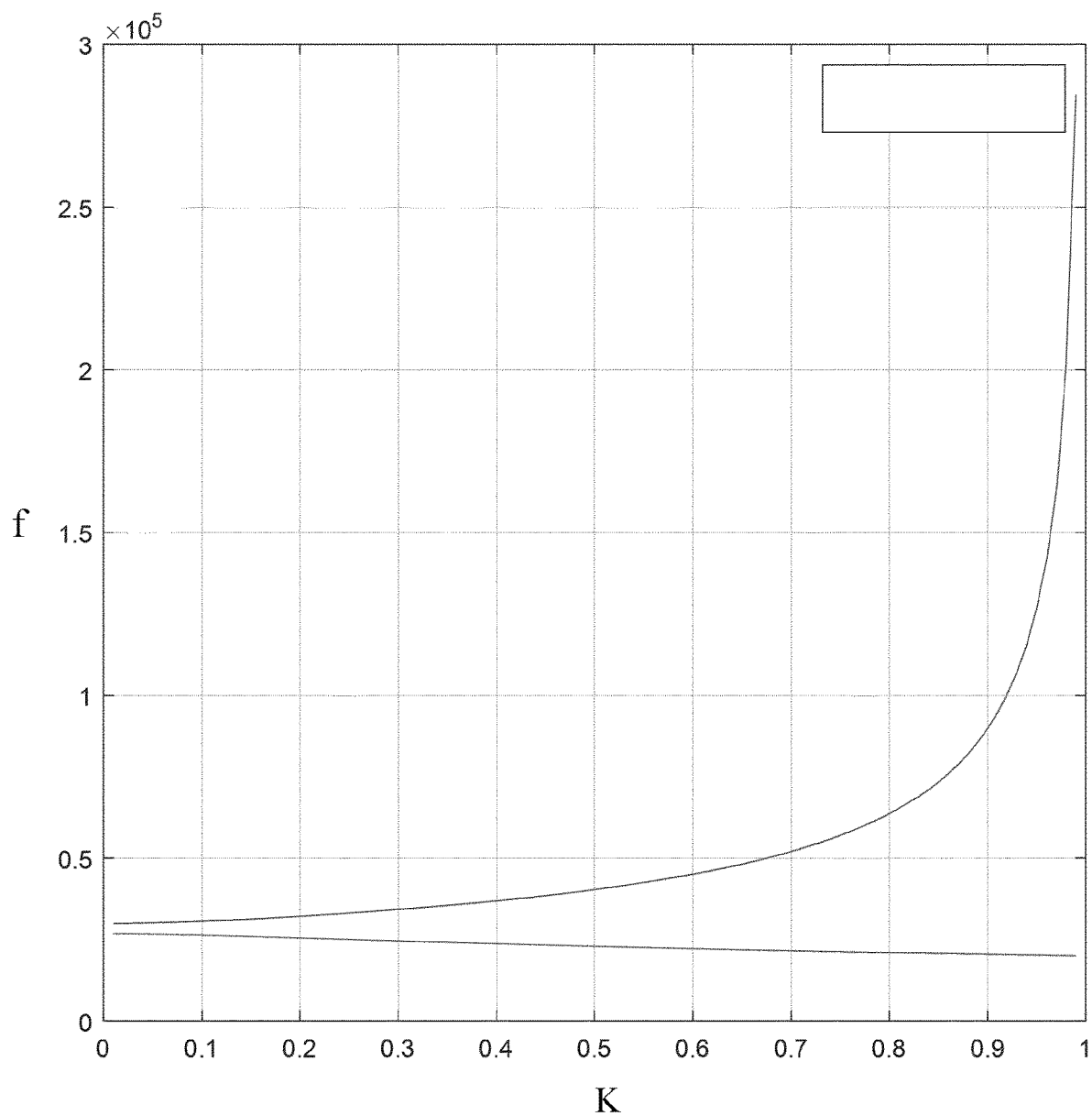
FIG. 9 illustrates an example of coupled resonance frequencies of an output resonance circuit of the power transmitter of FIG. 3 as a function of the coupling factor.
Figure 10:
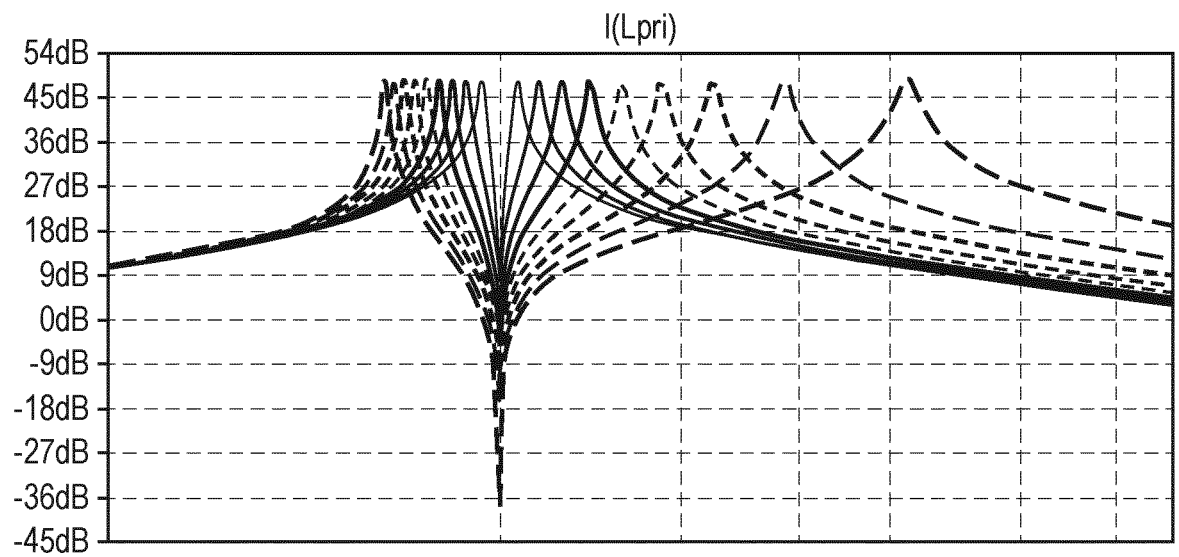
FIG. 10 illustrates an example of a response of an output resonance circuit of the power transmitter of FIG. 3.
Figure 11:
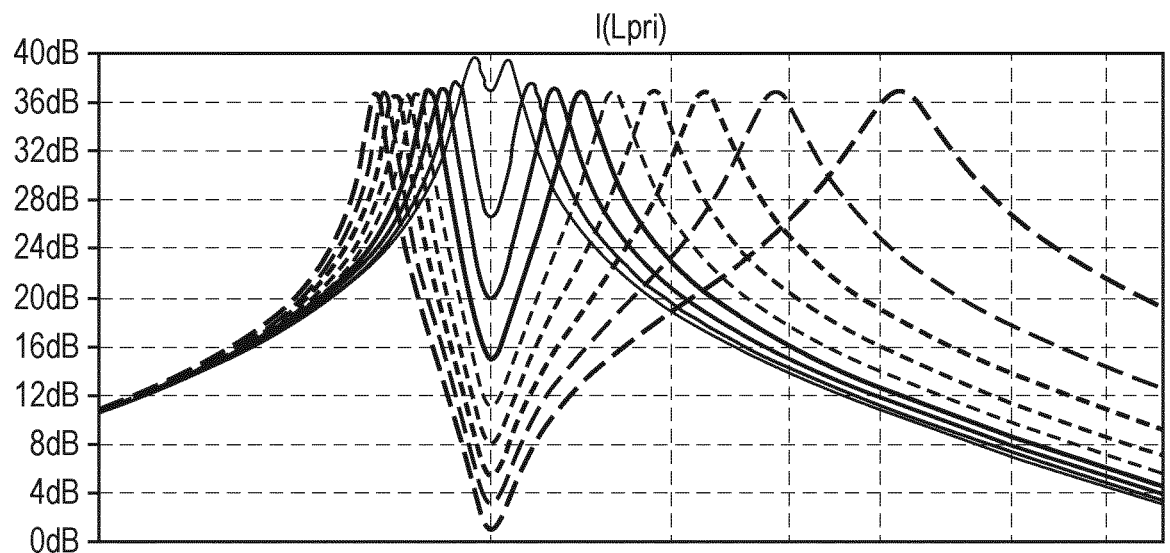
FIG. 11 illustrates an example of a response of an output resonance circuit of the power transmitter of FIG. 3.
Figure 11:
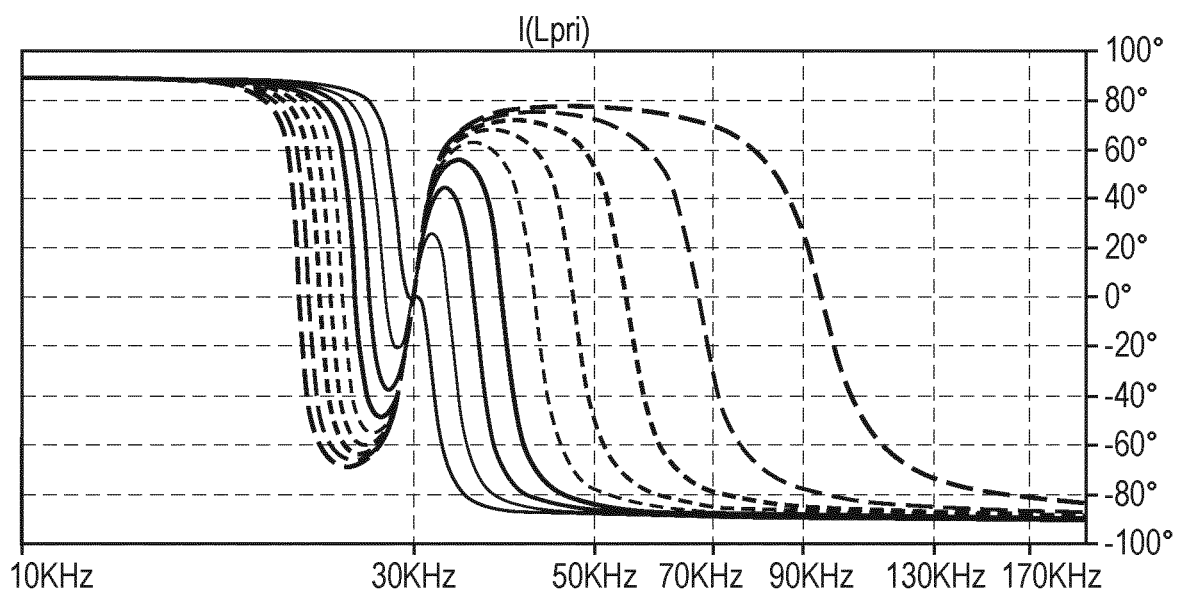
Figure 12:
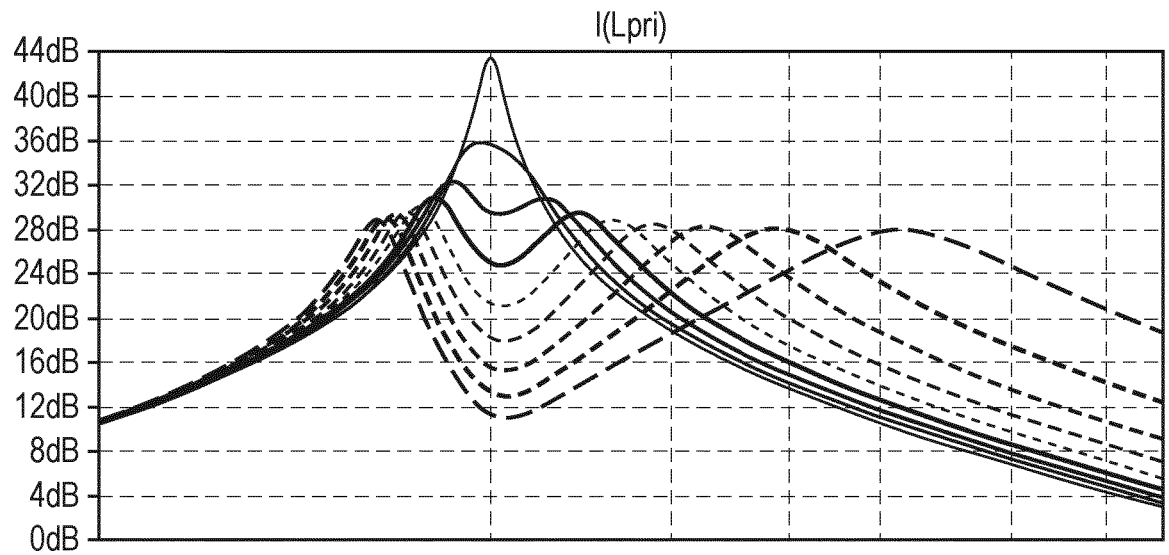
FIG. 12 illustrates an example of a response of an output resonance circuit of the power transmitter of FIG. 3.
Figure 12:
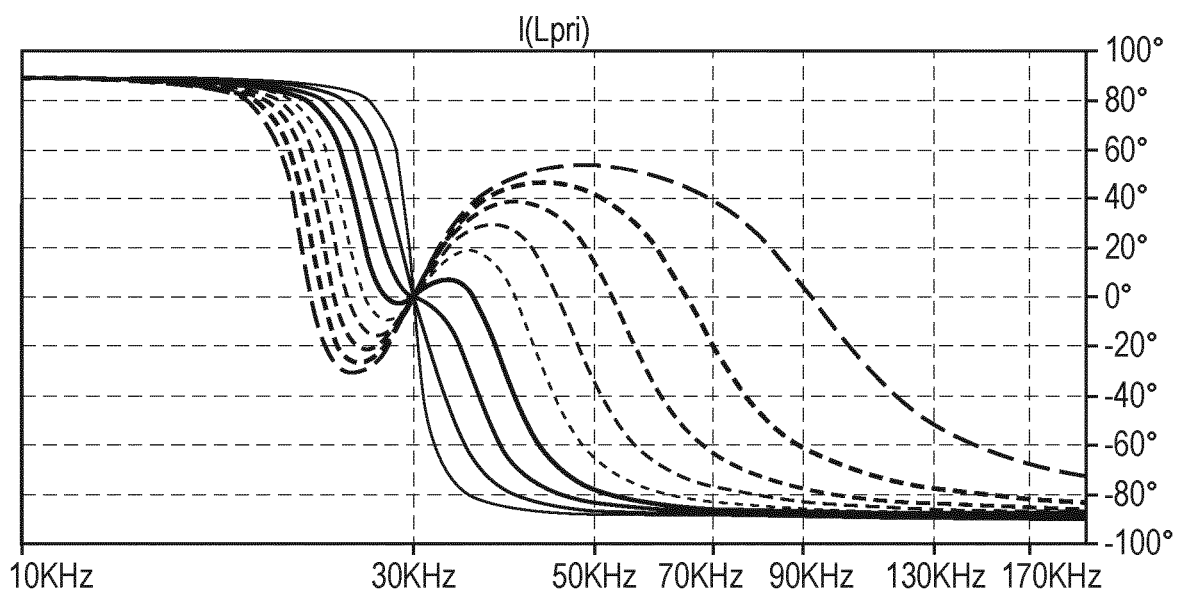
Figure 13:
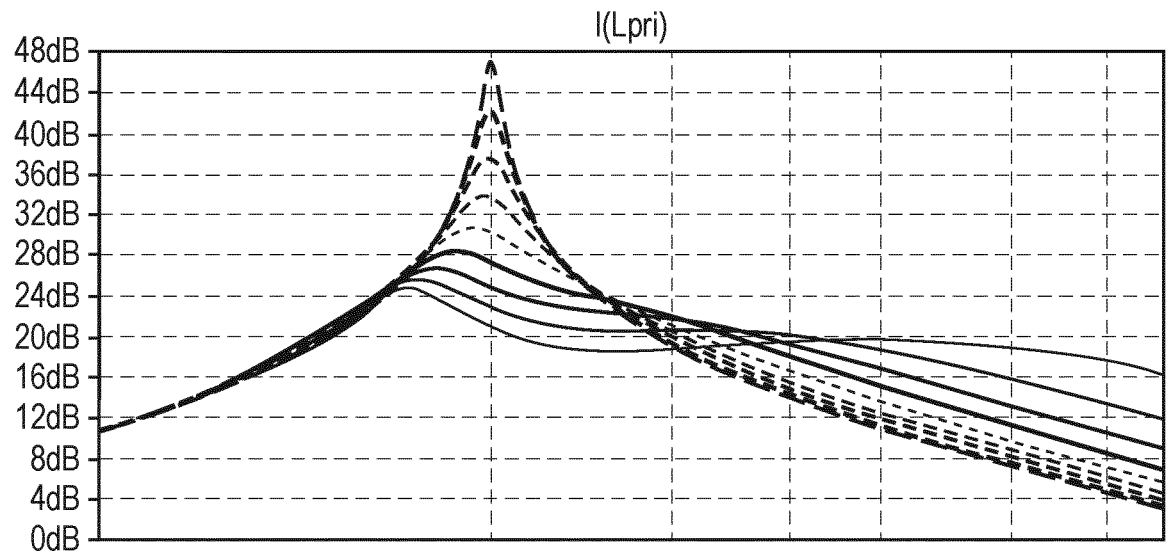
FIG. 13 illustrates an example of a response of an output resonance circuit of the power transmitter of FIG. 3.
Figure 13:
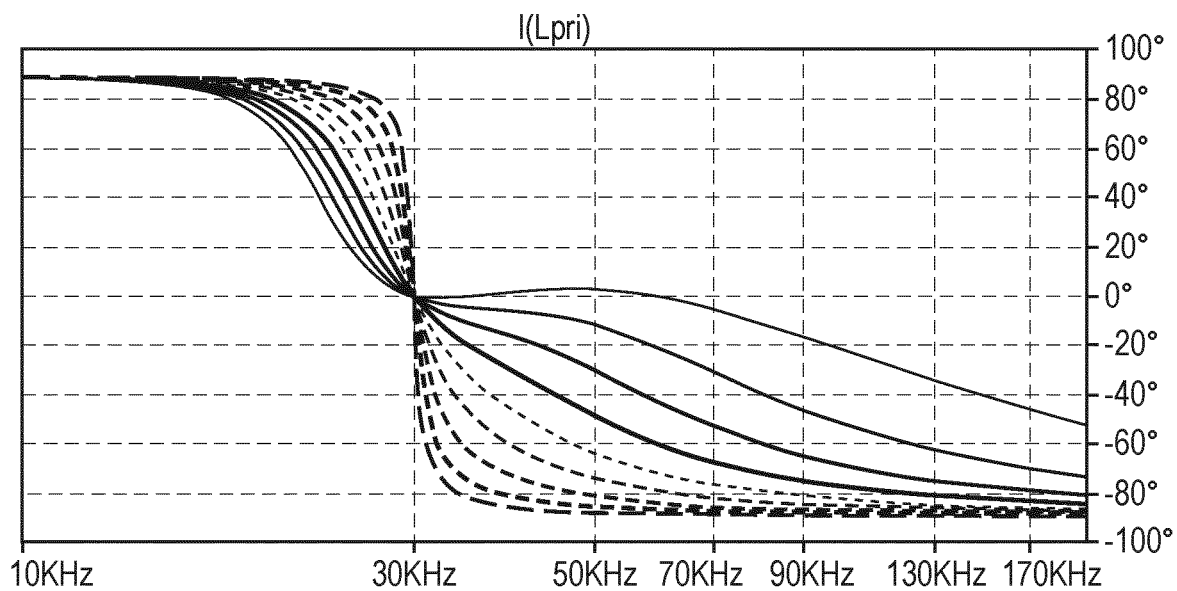
Figure 14:
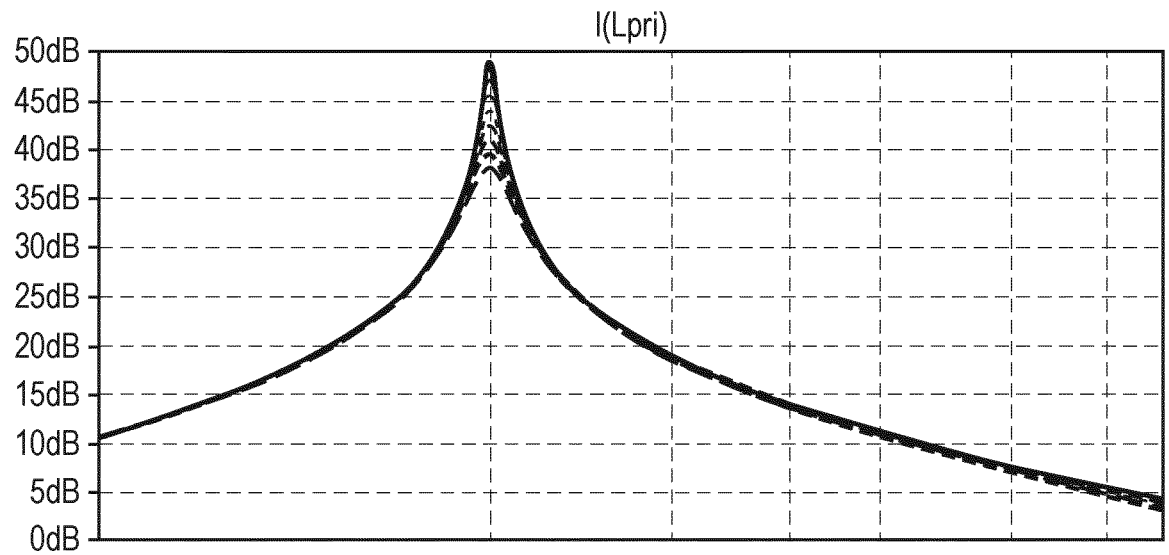
FIG. 14 illustrates an example of a response of an output resonance circuit of the power transmitter of FIG. 3.
Figure 14:
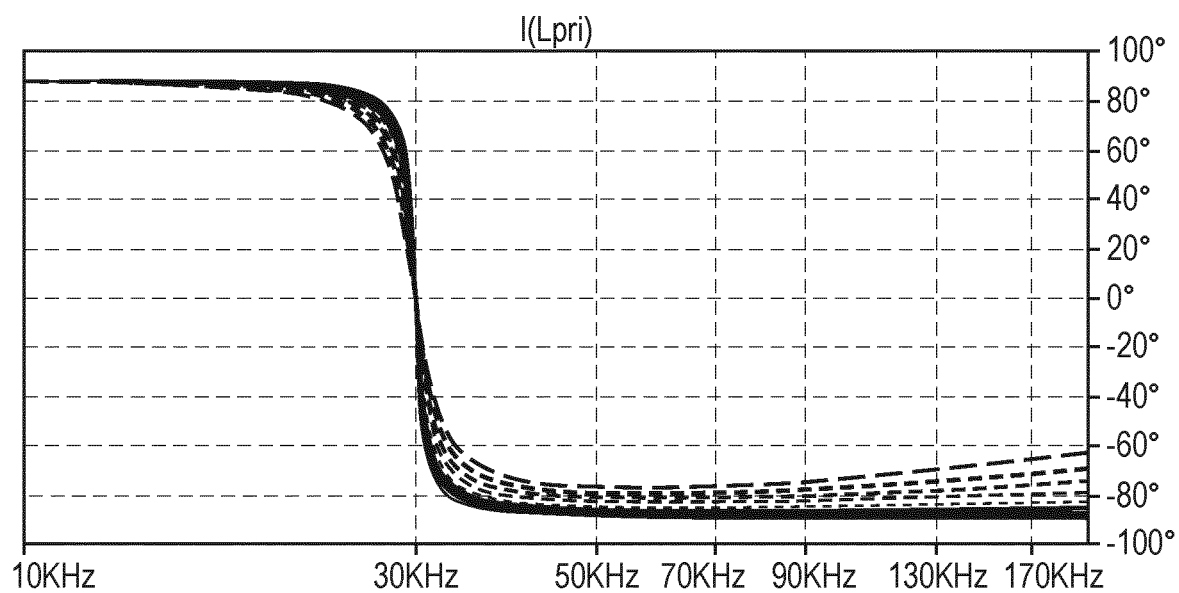

FIG. 9 illustrates an example corresponding to that of FIG. 8 but with the normalized average non-coupled resonance frequency of the output resonance circuit being at $0.268 \times 10^5$ and the normalized average non-coupled resonance frequency of the input resonance circuit still being at $0.3 \times 10^5$. As can be seen, this results in slightly different coupled resonance frequencies.

In some embodiments, measurements of such dependencies as shown in FIGS. 8 and 9 may during manufacturing and design be made for relevant power transmitter and receiver coil 107 combinations. The results may be stored in LUTs included in the power transmitter (or e.g. stored centrally and retrieved when setting up a new power transfer). Following the determination of a coupled resonance frequency, a table look-up may be performed by the estimator 309 to derive an estimated coupling factor.

In some embodiments, the resonance detector 307 may be arranged to detect the coupled resonance frequency during the resonance measurement time interval by varying the frequency of the drive signal, and specifically it may perform a frequency sweep over a range of frequencies which may correspond to the frequency interval in which the coupled resonance frequency is expected to lie, or within which it may be considered that the coupling factor is sufficiently high to provide acceptable power transfer. The resonance detector 307 may then monitor the drive signal and it may detect an extreme of e.g. the current or voltage amplitude. For example, for series resonance circuits, the resonance detector 307 may control the driver 301 to vary the frequency over a range and with a fixed voltage amplitude. It may then measure the current amplitude for the different frequencies and determine the coupled resonance frequency for which the highest current amplitude is determined. As another example, the resonance detector 307 may detect when the phase difference between the current and voltage of the drive signal is zero (or close to zero), i.e. when the loading by the output resonance circuit is purely resistive. If no coupled resonance frequency is detected within the frequency interval, this may indicate that the coupling factor is not within a suitable interval for power transfer and the power transfer may be terminated.

In some embodiments, the frequency sweep of the drive signal may be from higher frequencies towards lower frequencies and the coupled resonance frequency may be determined as the first detected frequency for which a resonance criterion (e.g. extrema for current or voltage amplitude of the signal or zero phase difference between voltage and current) is met. Thus, instead of e.g. detecting the global extreme, the first local extreme may be detected.

Such an approach may allow the highest coupled resonance frequency of the two to be detected. The inventors have realized that the largest variation of the coupled resonance frequency for varying coupling factor occurs for the highest coupled resonance frequency, and therefore that this may typically advantageously be used, especially if only one coupled resonance frequency is used.

In some embodiments, both coupled resonance frequencies may be detected and used to determine the coupling factor estimate. For example, two separate LUTs may be provided for respectively the lower and higher coupled resonance frequencies, and the coupling factor estimate may be determined as the average of the two table look-up results.

In other embodiments, other approaches for determining the coupled resonance frequency of the output resonance circuit may be used. For example, in some embodiments a successive approximation approach may be used. Such an approach would be highly advantageous and useful when basing the determination of the resonance frequency on frequency intervals. The approach may allow a fast detection of the resonance frequency or frequencies.

In some embodiments, the power receiver may communicate system parameters, such as e.g. the non-coupled resonance frequency and/or the receiver coil inductance to the power transmitter, and this may be used to determine the coupling factor from the coupled resonance frequency. For example, the LUTs may also be dependent on these power receiver factors, or different LUTs may be provided for different power receivers (indeed in some embodiments, a LUT may be provided by the power receiver).

In some embodiments, the determination of the coupling factor may be based on analytical formulas. Specifically, the estimation circuit 309 may be arranged to determine the coupling factor estimate in response to at least one of the following equations $$Fres1 := \frac{1}{\sqrt{2}} \cdot \sqrt{\frac{(fp^2 + fs^2) + \sqrt{(fp^2 + fs^2)^2 - 4 \cdot fp^2 fs^2 \cdot (1 - k^2)}}{1 - k^2}}$$

$$Fres2 := \frac{1}{\sqrt{2}} \cdot \sqrt{\frac{(fp^2 + fs^2) - \sqrt{(fp^2 + fs^2)^2 - 4 \cdot fp^2 fs^2 \cdot (1 - k^2)}}{1 - k^2}}$$

where $f_p$ is the non-coupled resonance frequency of the resonant output circuit, $f_s$ is a non-coupled resonance frequency of the power transfer input resonance circuit, Fres1 is the highest coupled operating resonance frequency, Fres2 is a lowest coupled resonance frequency, and k is the coupling factor.

These equations apply to coupled resonance circuits and may be used by the resonance detector 307 (either directly or indirectly).

In some embodiments, only one of the equations may be used, and indeed the coupling factor estimate may be based on only one of the coupled resonance frequencies. For example, as described, the highest coupled resonance frequency may be determined by detecting the first peak in a sweep from higher to lower frequencies. Based on the first equation above, and using known values for the non-coupled resonance frequencies of the input resonance circuit and output resonance circuit respectively, this highest coupled resonance frequency may then be used to calculate the coupling factor estimate.

The same approach may be used to determine the coupling factor based on the lowest coupled resonance frequency.

In some embodiments, both the highest and lowest coupled resonance frequencies may be measured and both equations may be used. For example, two coupling factor values may be calculated using respectively the first and second equation and respective measured coupled resonance frequencies, and the coupling factor estimate may be generated as the average of these. In other embodiments, the coupling factor estimate may be calculated as the one resulting in the lowest errors between the equations above and the measured values.

In some embodiments, both coupled resonance frequencies and both equations may be used but the non-coupled resonance frequency of the input resonance circuit is not used. Instead, this variable may be estimated using the equations above and the two coupled resonance frequencies. In such an approach a more complicated estimation and calculation may thus be used to avoid the necessity for the specific properties of the input resonance circuit to be known by the power transmitter. Such an approach may be particularly useful for implementation in an existing system where some power receivers may not be able to communicate this information.

The described approach is based on estimating a coupling factor by considering the change in resonance frequency that is caused by a coupling of the output resonance circuit to the input resonance circuit. The change is dependent on the coupling factor but is also dependent on the quality factor Q of the input resonance circuit. This can be seen in FIGS. 10-14 which show how the two coupled resonance frequencies vary for different coupling factors (within each graph, k=[0.1, 0.2, . . . 0.9]) but also how the change depends on the Q value (as can be seen by comparing the different graphs showing graphs for Q=1000, 10, 3, 1, 0.1 respectively).

In the approach, the quality factor of the input resonance circuit is during the resonance measurement time interval not less than ten, and typically it may be higher. This may result in the detection of the coupled resonance frequency(ies) to be reliable and reasonably accurate, and thus in the coupling factor estimate similarly being reliable and accurate. It may accordingly ensure that the adaptation of the operating point is reliable and may allow efficient operation.

In some embodiments, the high Q during the resonance measurement time interval may be ensured by the Q value for the input resonance circuit always being above ten, i.e. by the power receiver being designed for the input resonance circuit to always have a quality factor above 10. However, this is typically in contrast with the desire to provide the appropriate power to the load.

For example, for Ki systems, the loading of an input resonance circuit by typical power values result in Q values that are typically less than 5, and often less than 2.

In many embodiments, the power receiver may accordingly be arranged to switch the mode of operation from a lower quality factor mode for at least some time outside the resonance measurement time interval to a higher quality factor mode with a Q value of at least 10 during the resonance measurement time interval. This may allow efficient power transfer and efficient coupling factor estimation.

Thus, the power receiver may be arranged to switch from a power transfer mode in which the quality factor is not constrained to be above 10, and during which it may indeed be substantially less than 10 in order to allow efficient power transfer, to a measurement mode during the resonance measurement time interval where the quality factor is no less than ten.

This may for example be achieved by the switch 607. For example, if the power path couples the switch 607 and the load 605 directly to the input resonance circuit, the switch may couple the normal load 605 to the input resonance circuit outside of the resonance measurement time interval(s). However, during the resonance measurement time interval(s), the switch 607 may decouple the load 605. For an input parallel resonance circuit, the switch 607 may for example disconnect the load 605 so that no current is drawn from the input resonance circuit. In contrast, for an input series resonance circuit, the switch 607 may decouple the load by short circuiting the load 605 thereby short circuiting the power transfer input resonance circuit during the resonance measurement time interval.

In some embodiments, such a variation of the quality factor may occur without the power receiver comprising specific functionality. For example, in some embodiments, the load may inherently provide essentially a short-circuit during start up which may allow for a resonance measurement time interval prior to power transfer inherently having a high Q input resonance circuit. For example, when the load is a motor it may start up almost as a short circuit. As another example, when a rectifier and a large output capacitor is present in the power path, this will also behave almost like a short circuit when the capacitor is discharged.

In many embodiments, the resonance measurement time interval (or at least one resonance measurement time interval) may be prior to the power transfer. Specifically, the determination of the coupling factor estimate and the setting of the operating parameter may be performed during an initialization of a power transfer operation. Thus, prior to the power transfer, the power transmitter may determine a suitable operating parameter value for the specific power receiver and the specific positioning of the power receiver. It may then start the power transfer using this parameter value as the initial operating parameter value.

For example, in many embodiments, the approach may be used to determine initial loop gain and power level values for the power transfer signal. Accordingly, the system may initiate the power transfer in a state which is more likely to be close to the optimum operating point and a slow and gradual adaptation from an initial worst case safe operating point is not necessary. Thus, faster optimization can be achieved and the risk of not being able to reach the best operating point can be reduced.

Further, during the pre-power transfer coupling factor estimation, the power receiver may be entered into a measurement mode for the coupled resonance frequency detection. Specifically, the switch 607 may short circuit the load in order to provide a high quality factor for the input resonance circuit. When the system enters the power transfer phase, the power receiver may be switched back to normal power transfer operating mode, and specifically the short circuit may be removed.

In some embodiments, the approach may alternatively or additionally be applied during the power transfer phase. In such an approach, the coupling factor estimation may be particularly useful to adapt the loop parameters and performance. For example, it may be used to adapt the loop parameters such that substantially the same control performance can be achieved for different positions of the power receiver. Thus, improved performance, and in particular reduced sensitivity to variations in the positioning of the power receiver can be achieved.

In many embodiments in which the approach is employed during a power transfer phase, the system may be arranged to operate in a time slotted mode with the measurements and coupled resonance frequency detection being performed during measurement time intervals. The resonance measurement time interval may specifically be performed during reduced such measurement time intervals of a repeating time frame that further includes at least one power transfer time interval during which power is transferred to the power receiver.

In such embodiments, the system may thus utilize time division during the power transfer phase. In particular, detection of the coupled resonance frequencies and the power transfer may e.g. be performed in separate time intervals thereby allowing the interference between these to be reduced substantially.

Figure 15:
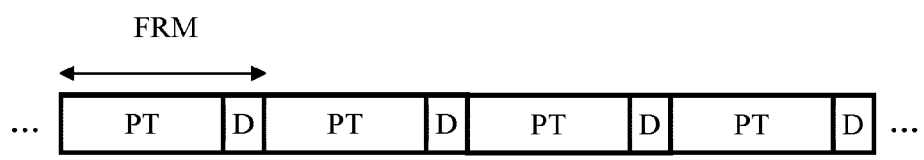
FIG. 15 illustrates an example of a time frame for the wireless power transfer system of FIG. 1.

In the example, the driver 301 and the transmitter coil 103 are during the power transfer intervals arranged to generate an electromagnetic power transfer signal for the purpose of transferring power to the power receiver. In addition, the drive signal may during a measurement time interval be used to detect the coupled resonance frequencies in order to determine the coupling factor estimate. The power transmitter may employ a repeating time frame for the drive signal during the power transfer phase where the time frame comprises at least one power transfer time interval and at least one resonance measurement time interval. An example of such a repeating time frame is illustrated in FIG. 15 where power transfer time intervals are indicated by PT and measurement time intervals are indicated by D (the time intervals may also be referred to as Detection time intervals). In the example, each time frame FRM comprises only one resonance measurement time interval and one power transfer time interval and these (as well as the time frame itself) have the same duration in each frame. However, it will be appreciated that in other embodiments, other time intervals may also be included in a time frame (such as e.g. communication intervals) or a plurality of resonance measurement time intervals and/or power transfer time intervals may be included in each time frame. Furthermore, the duration of the different time intervals (and indeed the time frame itself) may in some embodiments vary dynamically.

In the approach, the measurements, communication and the power transfer are thus separated in the time domain thereby resulting in reduced cross-interference from the power transfer to the measurement and coupling factor estimation. Thus, the variability and uncertainty resulting from variations in the operating conditions for the power transfer can be isolated from the measurement and estimation resulting in a more reliable and accurate estimation process. Further, it allows the drive signal to be generated (and optimized) for the detection of the coupled resonance frequency. In particular, it allows the resonance detector 307 to perform a frequency sweep and to perform suitable operations for this detection.

Furthermore, it allows the power receiver to specifically adapt to provide improved or optimum properties for the detection. In particular, in many embodiments, the power receiver may switch from a power operating mode during the power transfer time intervals during which the load is coupled to the input resonance circuit (and thus the quality factor of the input resonance circuit is low) to a measurement mode where it is ensure that the quality factor of the input resonance circuit is high, e.g. by the switch 607 shorting the load.

The time slotted approach may thus allow or facilitate the performance of the coupling factor estimation during the power transfer phase.

In some embodiments, the power transmitter may be arranged to determine an indication or measure of misalignment of the power receiver with respect to the power transmitter (and specifically of the receiver coil 107 with respect to the transmitter coil 103). Specifically, the lower the coupling factor, the higher the misalignment. Further, in such embodiments, the power transmitter may be arranged to generate a user output indicative of the misalignment. Specifically, it may provide a user alert indicating to the user that the power receiver should be repositioned in case the coupling factor is below a threshold.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent claim but rather indicates that the feature is equally applicable to other independent claims as appropriate. Furthermore, the order of features in the claims do not

The invention claimed is:

1. A power transmitter comprising:
an output resonance circuit, wherein the output resonance circuit comprises at least one transmitter coil and at least one capacitor;
a driver circuit, wherein the driver circuit is arranged to generate a drive signal for the output resonance circuit so as to generate a power transfer signal;
a resonance detector circuit,
wherein the resonance detector circuit is arranged to measure a first coupled resonance frequency for the output resonance circuit during a resonance measurement time interval,
wherein the first coupled resonance frequency is for a coupling between the output resonance circuit and a power transfer input resonance circuit of a power receiver,
wherein the power transfer input resonance circuit has a quality factor of no less than ten during the resonance measurement time interval;
an estimation circuit, wherein the estimation circuit is arranged to determine a coupling factor for a coupling between the at least one transmitter coil and at least one receiver coil in response to a non-coupled resonance frequency of the output resonance circuit and the first coupled resonance frequency; and
an adapter circuit, wherein the adaptor circuit is arranged to set an operating parameter in response to the coupling factor.

2. The power transmitter of claim 1,
wherein the resonance detector circuit is arranged to control the driver circuit so as to generate the drive signal at a varying frequency during the resonance measurement time interval,
wherein the resonance detector circuit is arranged to measure the first coupled resonance frequency in response to at least one of a voltage of the drive signal, a current of the drive signal, and a phase difference between the voltage of the drive signal and the current of the drive signal.

3. The power transmitter of claim 1,
wherein the resonance detector circuit is arranged to control the circuit driver so as to sweep a frequency of the drive signal from higher frequencies towards lower frequencies,
wherein the resonance detector circuit is arranged to measure the first coupled resonance frequency for which a resonance criterion for the drive signal is met.

4. The power transmitter of claim 1,
wherein the resonance measurement time interval occurs during an initialization of a power transfer operation,
wherein the operating parameter is an initial operating parameter of the power transfer operation.

5. The power transmitter of claim 1,
wherein the driver circuit is arranged to generate the drive signal in during a power transfer phase,
wherein a measurement time interval comprises the resonance measurement time interval.

6. The power transmitter of claim 1,
wherein the operating parameter is a control parameter,
wherein the control parameter is used to control a power level of the power transfer signal.

7. The power transmitter of claim 1,
wherein the operating parameter is a power loop parameter,
wherein the power loop parameter is a loop parameter of a power control loop,
wherein the power control loop is arranged to adapt a power level of the power transfer signal in response to power control messages received from the power receiver.

8. The power transmitter of claim 1, wherein the estimation circuit is arranged to determine the coupling factor in response to a non-coupled resonance frequency of the power transfer input resonance circuit.

9. The power transmitter of claim 1,
wherein the resonance detector circuit is arranged to measure a second coupled resonance frequency of the output resonance circuit during the resonance measurement time interval,
wherein the second operating resonance frequency is a third resonance frequency for the output resonance circuit in the presence of the power receiver
wherein the estimation circuit is arranged to determine the coupling factor in response to the second operating resonance frequency.

10. The power transmitter of claim 1, wherein the estimation circuit is arranged to determine the coupling factor using $$Fres1 := \frac{1}{\sqrt{2}} \cdot \sqrt{\frac{(fp^2 + fs^2) + \sqrt{(fp^2 + fs^2)^2 - 4 \cdot fp^2 fs^2 \cdot (1-k^2)}}{1-k^2}}$$

wherein $f_p$ is the non-coupled resonance frequency of the resonant output circuit,
wherein $f_s$ is a non-coupled resonance frequency of the power transfer input resonance circuit,
wherein Fres1 is the first coupled resonance frequency,
wherein k is the coupling factor.

11. A wireless power transfer system comprising:
a power transmitter,
wherein the power transmitter comprises:
an output resonance circuit, wherein the output resonance circuit comprises at least one transmitter coil and at least one capacitor;
a driver circuit, wherein the driver circuit is arranged to generate a drive signal for the output resonance circuit so as to generate a power transfer signal;
a resonance detector circuit,
wherein the resonance detector circuit is arranged to measure a first coupled resonance frequency for the output resonance circuit during a resonance measurement time interval,
wherein the first coupled resonance frequency is for a coupling between the output resonance circuit and a power transfer input resonance circuit of a power receiver,
wherein the power transfer input resonance circuit has a quality factor of no less than ten during the resonance measurement time interval;

an estimation circuit, wherein the estimation circuit is arranged to determine a coupling factor for a coupling between the at least one transmitter coil and at least one receiver coil in response to a non-coupled resonance frequency of the output resonance circuit and the first coupled resonance frequency; and an adapter circuit, wherein the adaptor circuit is arranged to set an operating parameter in response to the coupling factor; and a power receiver, wherein the power receiver comprises comprising a power transfer input resonance circuit, wherein the power transfer input resonance circuit comprises:

a receiver coil; and at least one capacitor, wherein the power transfer input resonance circuit has a quality factor of no less than ten during the resonance measurement time interval.

12. The wireless power transfer system of claim 11, wherein the power receiver further comprises a switching circuit, wherein the switching circuit is arranged to switch from a power transfer mode to a measurement mode during the resonance measurement time interval, wherein the quality factor is less than ten when the power receiver is in the power transfer mode, wherein the quality factor is greater or equal to ten when the power receiver is in the measurement mode.

13. The wireless power transfer system claim 11, wherein the power receiver further comprises a first circuit, wherein the first circuit is arranged to short circuit the power transfer input resonance circuit during the resonance measurement time interval.

14. A method of operation for a power transmitter, wherein the power transmitter comprises an output resonance circuit, wherein the output resonance circuit comprises at least one transmitter coil and at least one capacitor, the method comprising:

generating a drive signal for the output resonance circuit so as to generate a power transfer signal;

measuring a first coupled resonance frequency for the output resonance circuit during a resonance measurement time interval, wherein the first coupled resonance frequency is for a coupling between the output resonance circuit and a power transfer input resonance circuit of a power receiver, wherein the power transfer input resonance circuit has a quality factor of no less than ten during the resonance measurement time interval;

determining a coupling factor for a coupling between the at least one transmitter coil and at least one receiver coil in response to a non-coupled resonance frequency of the output resonance circuit and the first coupled resonance frequency; and setting an operating parameter in response to the coupling factor.

15. The power transmitter of claim 1, wherein the estimation circuit is arranged to determine the coupling factor using $$Fres2 := \frac{1}{\sqrt{2}} \cdot \sqrt{\frac{(fp^2 + fs^2) - \sqrt{(fp^2 + fs^2)^2 - 4 \cdot fp^2 fs^2 \cdot (1 - k^2)}}{1 - k^2}}$$

wherein $f_p$ is the non-coupled resonance frequency of the resonant output circuit, wherein $f_s$ is a non-coupled resonance frequency of the power transfer input resonance circuit, wherein Fres2 is a second coupled resonance frequency, wherein k is the coupling factor.

16. A computer program stored on a non-transitory medium, wherein the computer program when executed on a processor performs the method as claimed in claim 14.

17. The method of claim 14, further comprising:

generating the drive signal at a varying frequency during the resonance measurement time interval; and measuring the first coupled resonance frequency in response to at least one of a voltage of the drive signal, a current of the drive signal, and a phase difference between the voltage of the drive signal and the current of the drive signal.

18. The method of claim 14, further comprising:

sweeping a frequency of the drive signal from higher frequencies towards lower frequencies; and measuring the first coupled resonance frequency for which a resonance criterion for the drive signal is met.

19. The method of claim 14, wherein the resonance measurement time interval occurs during an initialization of a power transfer operation, wherein the operating parameter is an initial operating parameter of the power transfer operation.

20. The power transmitter of claim 1, further comprising generating the drive signal in during a power transfer phase, wherein a measurement time interval comprises the resonance measurement time interval.

* * * * *